US010678906B1

(12) United States Patent
Loladia et al.

(10) Patent No.: US 10,678,906 B1
(45) Date of Patent: Jun. 9, 2020

(54) MULTI-SERVICE AND MULTI-PROTOCOL CREDENTIAL PROVIDER

(71) Applicant: Amazon Technologies, Inc., Seattle, WA (US)

(72) Inventors: Rameez Loladia, Seattle, WA (US); Mark Edward Rafn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 629 days.

(21) Appl. No.: 15/389,317

(22) Filed: Dec. 22, 2016

(51) Int. Cl.
*G06F 21/45* (2013.01)
*H04L 29/06* (2006.01)

(52) U.S. Cl.
CPC .......... *G06F 21/45* (2013.01); *H04L 63/0884* (2013.01); *H04L 63/166* (2013.01)

(58) Field of Classification Search
CPC .... G06F 21/45; H04L 63/166; H04L 63/0884
See application file for complete search history.

(56) References Cited

U.S. PATENT DOCUMENTS

| | | | |
|---|---|---|---|
| 2003/0163733 A1* | 8/2003 | Barriga-Caceres | G06F 21/33 726/5 |
| 2005/0021836 A1* | 1/2005 | Reed | G06F 9/542 709/238 |
| 2010/0205427 A1* | 8/2010 | Bauer | H04L 63/0884 713/151 |
| 2014/0129838 A1* | 5/2014 | Kim | H04L 9/3213 713/171 |
| 2016/0119348 A1* | 4/2016 | Kus | H04L 63/10 726/1 |
| 2016/0259936 A1* | 9/2016 | Mukherjee | G06F 21/45 |
| 2017/0329945 A1* | 11/2017 | Sabiwalsky | G06F 21/31 |
| 2018/0278607 A1* | 9/2018 | Loladia | H04L 41/0893 |

\* cited by examiner

*Primary Examiner* — Joseph P Hirl
*Assistant Examiner* — Thomas A Gyorfi
(74) *Attorney, Agent, or Firm* — Knobbe, Martens, Olson & Bear, LLP

(57) ABSTRACT

A communication system and method for the utilization of authentication protocols to authenticate computing devices. An authentication service provider can authenticate a computing device after a first authentication by an authentication protocol. Computing devices can use the authentication to receive additional credential to access one or more service providers.

20 Claims, 11 Drawing Sheets

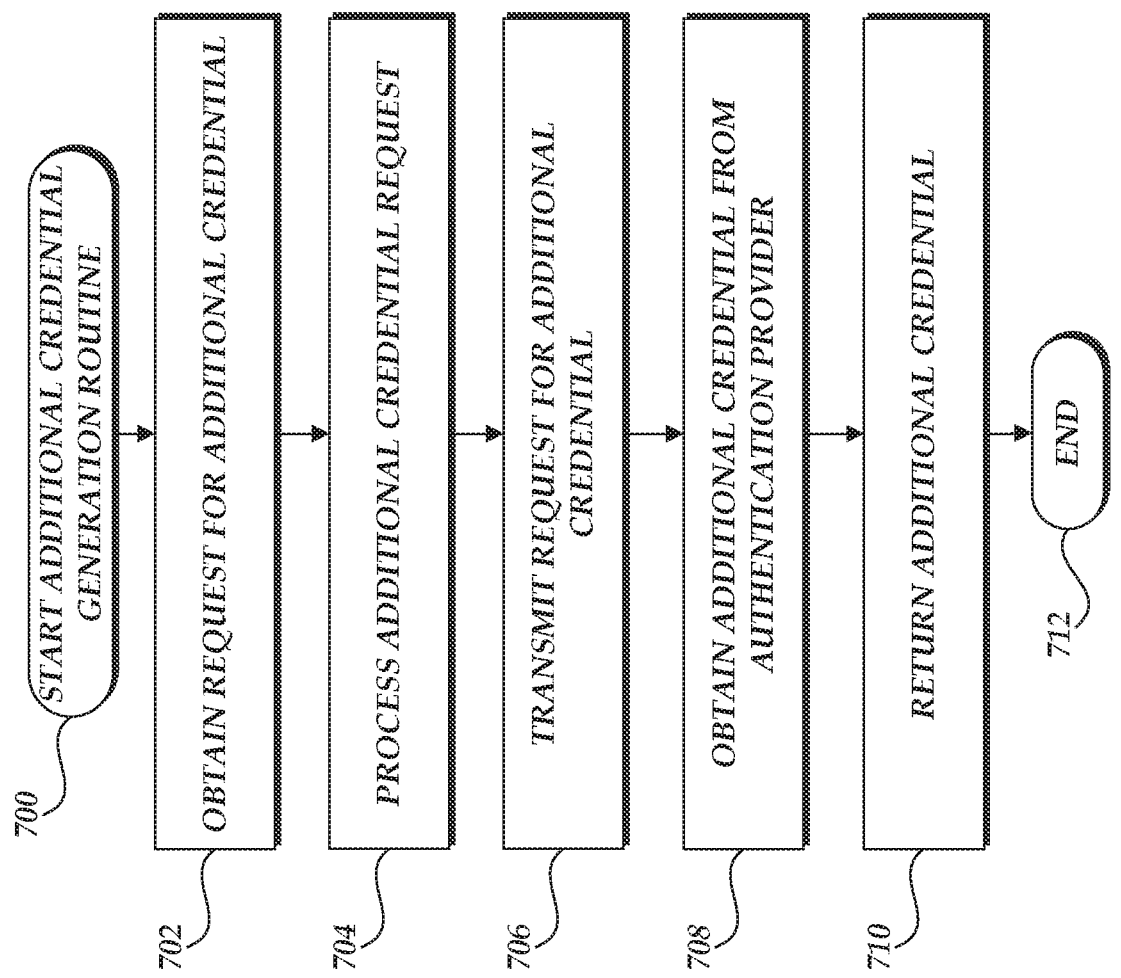

US 10,678,906 B1

MULTI-SERVICE AND MULTI-PROTOCOL CREDENTIAL PROVIDER

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 7 is a flow diagram illustrative of additional credential request processing routine implemented by a messaging broker component in accordance with an illustrative embodiment.

DETAILED DESCRIPTION

Figure 1:
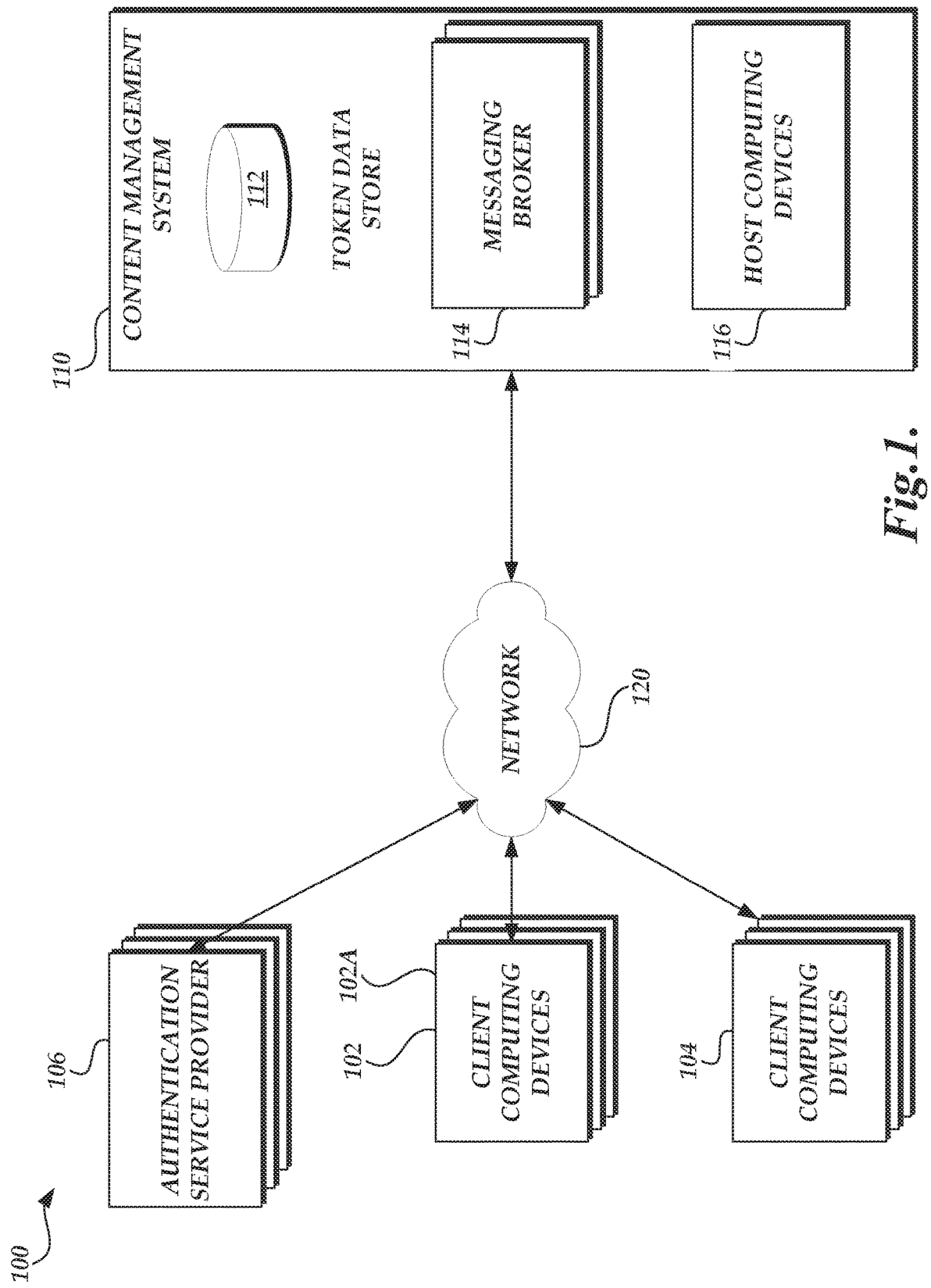
FIG. 1 is a block diagram of an authentication management environment that includes one or more client devices, one or more authentication service providers, and a content management system according to one embodiment.

Generally described, the present application corresponds to the management of data transmitted between computing devices in a communication network. More specifically, aspects of the present application correspond to the utilization of authentication protocols to facilitate communication with client computing devices utilizing messaging protocols. One or more client devices are specifically configured to communicate with other devices (including other client devices) via a messaging protocol, such as the MQ Telemetry Transport (MQTT) messaging protocol. Illustratively, the client devices correspond to a category of client devices, generally referred to Internet of Things ("IoT") devices, that have a reduced set of functionality. The exchange of messages in accordance with the messaging protocol is facilitated through an additional network component, a messaging broker, so that messages are not directly sent between two client devices. Rather, each authenticated client device can register to receive messages that are associated with a specific publication topic. Accordingly, as messages are published by a transmitting client device and identified with a publication topic, the messaging broker matches the published message with the registered client devices and forwards the published message to all the registered devices. Client devices can function as components that received published messages and components the publish messages.

In accordance with aspects of the present application, a messaging broker authenticates a client device using a mutual authentication protocol, such as the Transport Layer Security (TLS) handshake protocol. The authentication service provider causes an authentication service provider to generate and send an access token to the client device to be used for later authentication in accordance with a messaging protocol.

With continued reference to the previous example, the authentication service provider is in communication with the messaging service provider to facilitate federated identity verification/validation as part of the messaging authentication process or sub-process. If the authentication process with the authentication service provider is successful and a token has been generated, the client device can utilize the token as part of subsequent connection exchanges between the client device and the messaging broker. More specifically, the client device attempting to establish a communication link between the client device and the messaging broker will include the token as part of the initial handshaking communication request. In turn, the messaging broker can responsively validate that authentication token with the authentication service provider. If validated, the client device can receive a communication link establishment confirmation. Additionally, the client device can be associated with various permissions/rights based on the authentication token provided or the authentication process utilized to obtain the processed token.

With continued reference to the previous example, the client device can persist the token for subsequent authentication with the messaging broker. As subsequent messaging interactions occur as defined or supported in the messaging protocol, the client device sends communications link request with the persisted token. The messaging broker authenticates the token or keeps information corresponding to previously authenticated tokens. If validated, the client device can receive a communication link establishment confirmation without requirement for the additional overhead of the validation exchange. Additionally, the client device can be associated with various permissions/rights based on the authentication token provided or the authentication process utilized to obtain the processed token.

Although aspects of some embodiments described in the disclosure will focus, for the purpose of illustration, on the MQTT messaging protocol, TLS authentication protocol, OpenID Connect authentication layer protocol, and other configuration of the devices, one skilled in the relevant art will appreciate that the examples are illustrative only and are not necessarily intended to be limiting.

FIG. 1 is a block diagram depicting an illustrative logical network 100 including multiple client computing devices 102, multiple client computing devices 104 and multiple authentication service providers 106 in communication with a content management system 110 via a network 120. While the client computing devices 102, client computing devices 104 and authentication service providers 106 are shown as a group within FIG. 1, the, client computing devices 104 and authentication service providers 106, individually or as a grouping may be geographically distant, and independently owned or operated. For example, the client computing devices 102 could represent a multitude of users in various global, continental, or regional locations accessing the content management system 110. In another example, the client computing devices 104 could represent a grouping of multiple of client devices associated with a specific user, such as number of computing components located with one or more premises. Similarly, while one set of illustrative components is shown to represent the content management system 110, multiple instances of each component may be present within the content management system 110, and such components may be located within geographically diverse areas (e.g., globally, continentally, or regionally), in order to provide a wide geographical presence for the content management system 110.

Network 120 may be any wired network, wireless network, or combination thereof. In addition, the network 120 may be a personal area network, local area network, wide area network, cable network, satellite network, cellular telephone network, or combination thereof. In the example environment of FIG. 1, network 120 is a global area network (GAN), such as the Internet. Protocols and components for communicating via the other aforementioned types of communication networks are well known to those skilled in the art of computer communications and thus, need not be described in more detail herein. While each of the client computing devices 102, client computing devices 104, authentication service providers 106, and content management system 110 is depicted as having a single connection to the network 120, individual components of the client computing devices 102, client computing devices 104 and authentication service providers 106, and content management system 110 may be connected to the network 120 at disparate points. Accordingly, communication times and capabilities may vary between the components of FIG. 1.

Client computing devices 102 may include any number of different computing devices capable of communicating with the content management system 110 and social networks 120. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, input and output capabilities, etc.) than the user computing devices 104 and content management system 110. Illustrative components of a client computing device 102 will be described with regard to FIGS. 2 and 2A. In one embodiment, the client computing devices 102 can be referred to an Internet of Things ("IOT") devices representative of a class of devices in which computing functionality can be embedded within devices having at least one additional alternative functionality. Examples include, but are not limited, household appliances, controls for various other devices, consumer goods, and the like.

Similar to the client computing devices 102, the user computing devices 104 may include any number of different computing devices capable of communicating with the content management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 104 may optionally include one or more data stores (not shown in FIG. 1) including various applications or computer-executable instructions, such as web browsers, used to implement the embodiments disclosed herein. Illustrative components of a user computing device 104 will be described with regard to FIG. 3. For purposes of illustration, user computing devices 104 are representative of a class of devices having increased available computing resources, including the ability for input and output mechanisms typically exemplified with interaction with social networks 120.

Similar to the client computing devices 102 and computing devices 104, the authentication service providers 106 may include any number of different computing devices capable of communicating with the content management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each authentication service provider 104 may optionally include one or more data stores (not shown in FIG. 1) including various applications or computer-executable instructions, such as web browsers, used to implement the embodiments disclosed herein. On an individual basis, authentication service providers 106 may generally be configured to generate and/or provide identification and/or authentication services, keys, tokens, and the like. Authentication service providers 106 may be configured to generate tokens in accordance with a standard authentication protocol, such as OpenID Connect or other protocol.

In accordance with embodiments, the content management system 110 includes one or more servers for implementing services of a messaging broker 114, one or more host computing devices 116 for implementing virtual machine instances associated with client computing devices 102, and a token data store 112. As described in further detail below, the messaging broker 114 can receive registration request from client computing devices 102 and authentication service providers 104 for content items associated with particular topics. As such, in some aspects, the messaging broker 114 may receive content published by the authentication service providers 104 that include executable code or other instructions to be executed by the client devices 102. In other aspects, the messaging broker 114 can receive content published by the client computing devices 102 corresponding to a processing result, authentication request, token, or the like. The messaging broker 114 can then publish the received content. Illustrative components of a messaging broker 114 will be described with regard to FIG. 3.

It will be appreciated by those skilled in the art that the content management system 110 may have fewer or greater components than are illustrated in FIG. 1. Thus, the depiction of the content management system 110 in FIG. 1 should be taken as illustrative. For example, in some embodiments, components of the content management system 110, such as the messaging broker 114, may be executed by one or more virtual machines implemented in a hosted computing environment. A hosted computing environment may include one or more rapidly provisioned and released computing resources, which computing resources may include computing, networking or storage devices.

Figure 2:
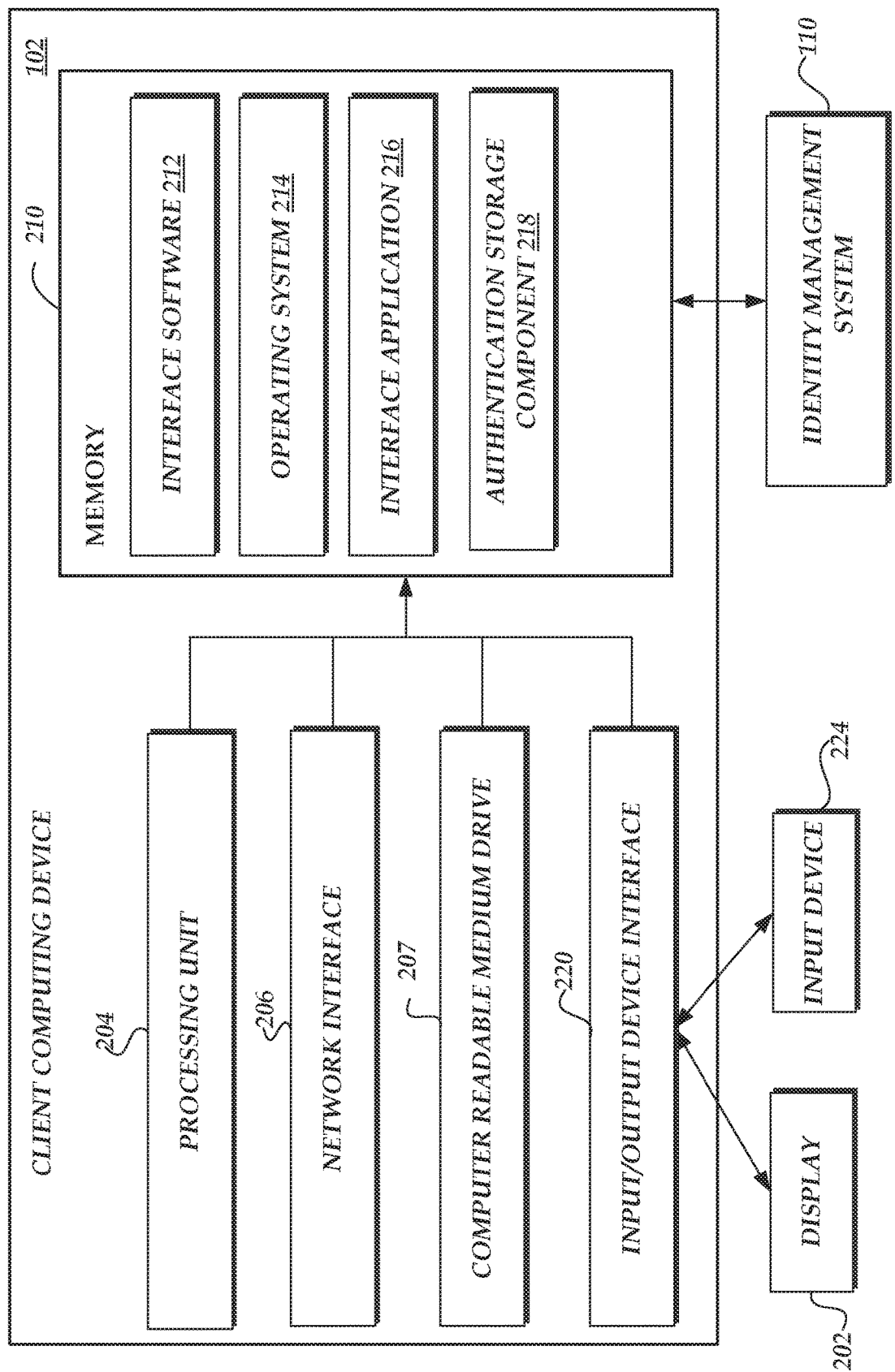
FIGS. 2 and 2A are block diagrams of illustrative components of a limited resource client computing device configured to remotely process content in accordance with an illustrative embodiment.

FIG. 2 depicts one embodiment of an architecture of an illustrative client computing device 102 that can generate and process social network information in accordance with the present application. The general architecture of the client computing device 102 depicted in FIG. 2 includes an arrangement of computer hardware and software components that may be used to implement aspects of the present disclosure. As illustrated, the client device 102 includes a processing unit 204, a network interface 206, a computer readable medium drive 207, an input/output device interface 220, an optional display 202, and an input device 224, all of which may communicate with one another by way of a communication bus. Illustratively, the client computing device 102 may have more limited functionality and components, such as inputs or outputs, as embedded devices.

The network interface 206 may provide connectivity to one or more networks or computing systems, such as the network 120 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the client computing device 102 may omit the display 202 and input device 224, while providing input/output capabilities through one or more alternative communication channel (e.g., via the network interface 206). Additionally, the client device 102 may omit the input and output interface 220 altogether as well.

The memory 210 may include computer program instructions that the processing unit 204 executes in order to implement one or more embodiments. The memory 210 generally includes RAM, ROM or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a browser application 216 for accessing content. Illustratively, the browser application 216 may encompass a full software browser application, portions of a browser application or simply be a software application (or executable instructions) that provide for data connectivity. The memory 210 may further include a social network component 218 for communicating with and processing information from one or more social networks 120. The client computing devices 102 can further include a social network data store 218 for maintaining social network configuration or profile information for facilitating communication with the social networks 120.

Figure 2A:
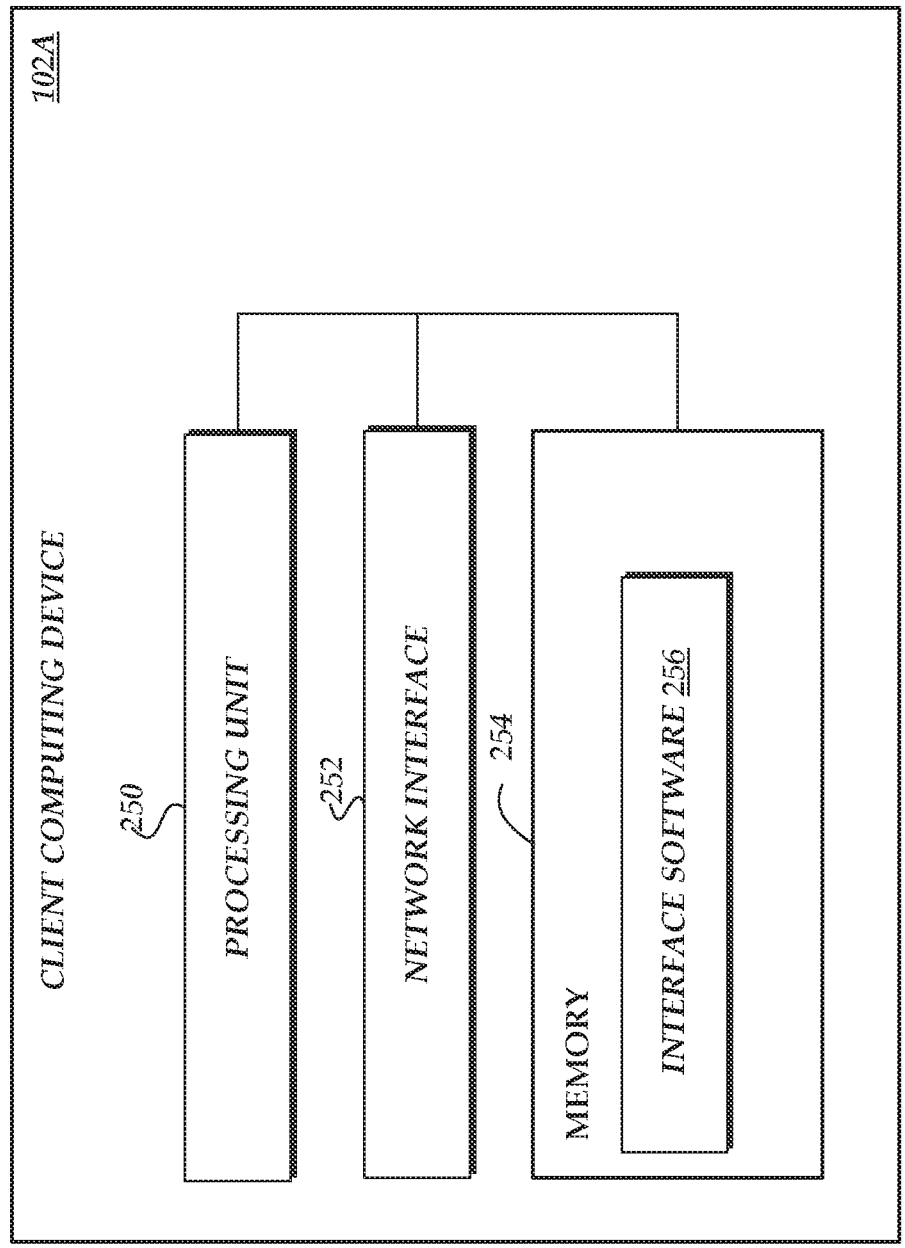

FIG. 2A depicts one embodiment of an alternative architecture of an illustrative client computing device 102A that can generate and process social network information or be utilized in conjunction with the generation and processing of social network information in accordance with the present application. The general architecture of the client computing device 102A depicted in FIG. 2 includes an arrangement of computer hardware and software components that may be used to implement aspects of the present disclosure. However, client computing device 102A may be associated with a reduced of components that may limit the computing functionality and operation of the client device 102A. As illustrated, the client device 102A includes a processing unit 250 and a network interface 252 that communicate with a communication bus. Unlike client device 102 (FIG. 2), the client device 102 may not have a computer readable medium drive, an input/output device interface, an optional display, or an input device.

The network interface 252 may provide connectivity to one or more networks or computing systems, such as the network 120 of FIG. 1. The processing unit 250 may thus receive information and instructions from other computing systems or services via a network. The memory 254 may include computer program instructions that the processing unit 250 executes in order to implement one or more embodiments. The memory 254 generally includes RAM, ROM or other persistent or non-transitory memory. In this embodiment, the memory 254 may store necessarily store a full operating system that provides computer program instructions for use by the processing unit 250 in the general administration and operation of the client 102A. Rather, in one embodiment, the memory 254 includes an interface software component 256 for accessing receiving and processing instructions.

Figure 3:
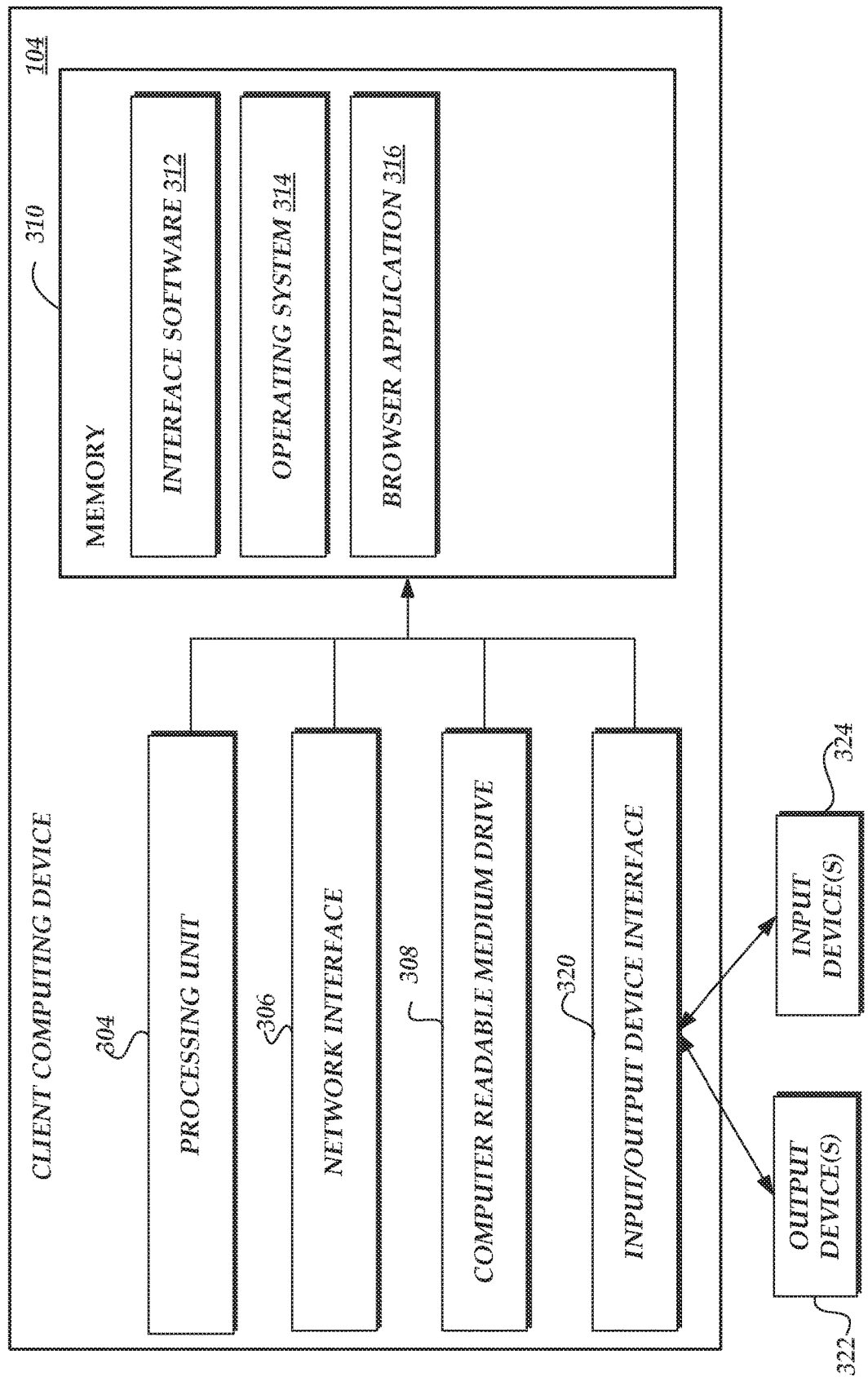
FIG. 3 is a block diagram of illustrative components of a client computing device configured to remotely process content in accordance with an illustrative embodiment.

FIG. 3 depicts one embodiment of an architecture of an illustrative user computing device 104 that can generate and process authentication workflow processing information in accordance with the present application. The general architecture of the user computing device 104 depicted in FIG. 3 includes an arrangement of computer hardware and software components that may be used to implement aspects of the present disclosure. As illustrated, the user computing device 104 includes a processing unit 304, a network interface 306, a computer readable medium drive 307, an input/output device interface 320, one or more output devices 322, and one or more input devices 324, all of which may communicate with one another by way of a communication bus.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display 302 via the input/output device interface 330. The input/output device interface 330 may also accept input from the optional input device 324, such as a keyboard, mouse, digital pen, etc. In some embodiments, the user computing device 104 may include more (or fewer) components than those shown in FIG. 3.

The memory 310 may include computer program instructions that the processing unit 304 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the user computing device 104. The memory 310 may further include computer program instructions and other information for implementing aspects of the present disclosure. For example, in one embodiment, the memory 310 includes a browser application 316 for accessing content and communicating with and processing information, such as defining the authentication workflows implemented by the messaging broker 114.

Figure 4:
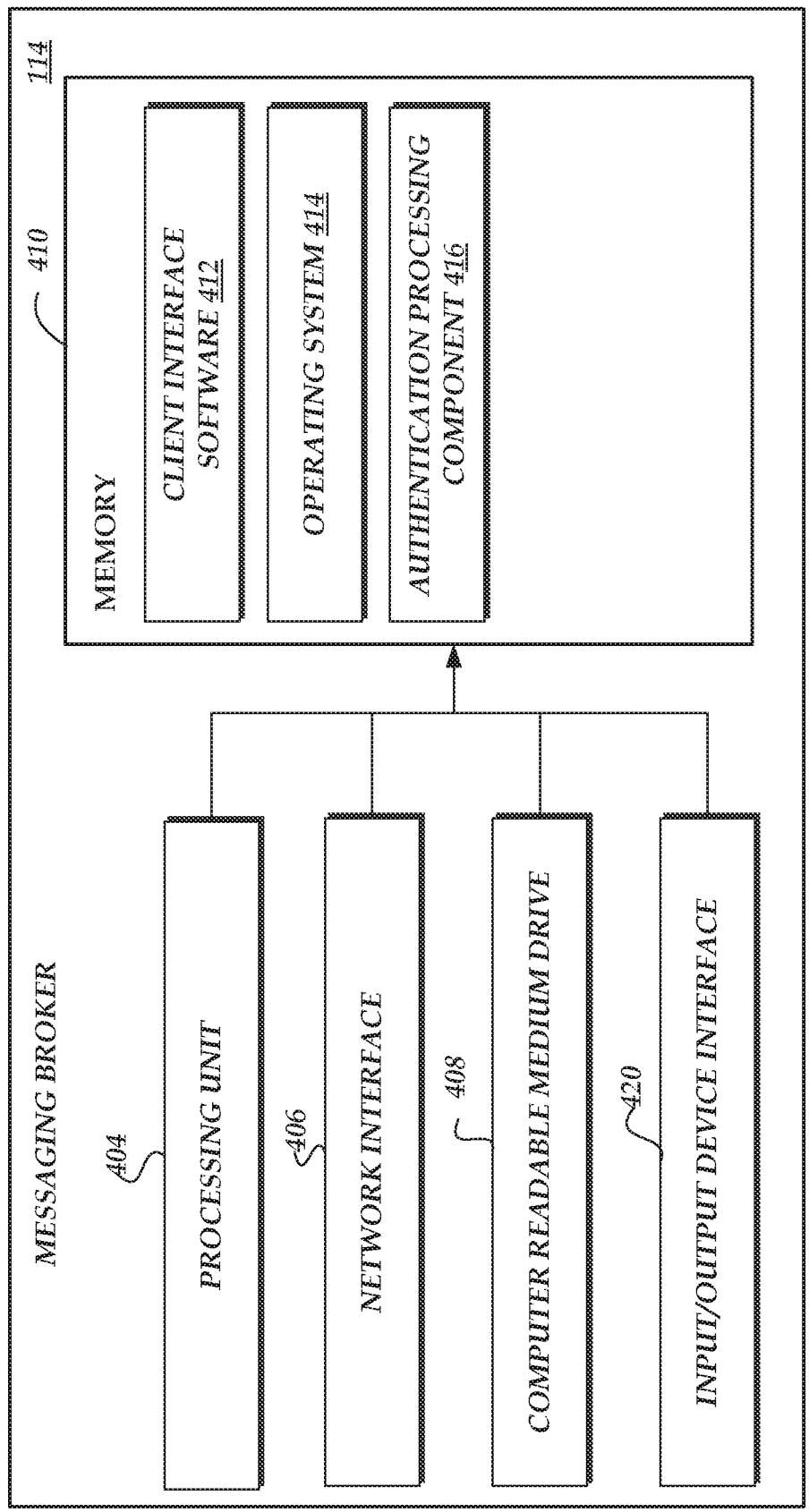
FIG. 4 is a block diagram of illustrative components of a messaging broker computing device configured to manage authentication in accordance with an illustrative embodiment.

FIG. 4 depicts one embodiment of an architecture of an illustrative server for implementing the messaging broker services 114 component described herein. The general architecture of the messaging broker component 114 depicted in FIG. 4 includes an arrangement of computer hardware and software components that may be used to implement aspects of the present disclosure. As illustrated, the messaging broker component 114 includes a processing unit 404, a network interface 406, a computer readable medium drive 408, an input/output device interface 420. Although not illustrated, the messaging broker services component can interface with a variety of peripherals devices (e.g., input devices or output devices) via the input/output interface component 420. The components of the messaging broker service component 114 may communicate with one another by way of a communication bus. The components of the messaging services 114 may be physical hardware components or implemented in a virtualized environment.

The network interface 406 may provide connectivity to one or more networks or computing systems, such as the network 120 of FIG. 1. The processing unit 404 may thus receive information and instructions from other computing systems or services via a network. The processing unit 404 may also communicate to and from memory 410 and further provide output information for output devices via the input/output device interface 420. The input/output device interface 420 may also accept input from the optional input devices, such as a keyboard, mouse, digital pen, etc. In some embodiments, the messaging services 114 may include more (or fewer) components than those shown in FIG. 4.

The memory 410 may include computer program instructions that the processing unit 404 executes in order to implement one or more embodiments. The memory 410 generally includes RAM, ROM or other persistent or non-transitory memory. The memory 410 may store an operating system 414 that provides computer program instructions for use by the processing unit 404 in the general administration and operation of the messaging services 114. The memory 410 may further include computer program instructions and other information for implementing aspects of the present disclosure. For example, in one embodiment, the memory 410 includes client interface software 412 for receiving and processing content requests from client devices 102 and an operating system 414 for the messaging broker services component 114. Additionally, the memory 410 includes an authentication processing component 416 for processing messages and providing additional authentication credentials as will be described herein.

Turning now to FIGS. 5A-5D, illustrative interactions between the components of the content management system 110 to authenticate a client computing device 102 or client computing device 102A will be described. More specifically, FIGS. 5A-5D will be described with regard to illustrative interactions between a client computing device 102, an authentication service provider 106 and the messaging broker 114. Additionally, although depicted as a single interaction between a client computing device 102, authentication service provider 106 and the messaging broker 114, in some embodiments, the messaging broker 114 can interact with a plurality of client computing devices 102 or client computing devices 102A using the same processes illustrated in FIGS. 5A-5D. Still further, in other embodiments, the authentication of the client computing device 102 with the messaging broker 114 can omit aspects related to the provisioning of a token. For ease of description, as mentioned above, the FIGS. 5A-5D will be described with regard to a client computing device 102. However, one skilled in the relevant art will appreciate that the interaction illustrated in these figures may be equally applicable to client computing devices 102A or a combination of client computing devices 102 and client computing devices 102A. Accordingly, reference in any of the drawing figures solely to a client computing device 102 should not be construed as limiting.

Figure 5A:
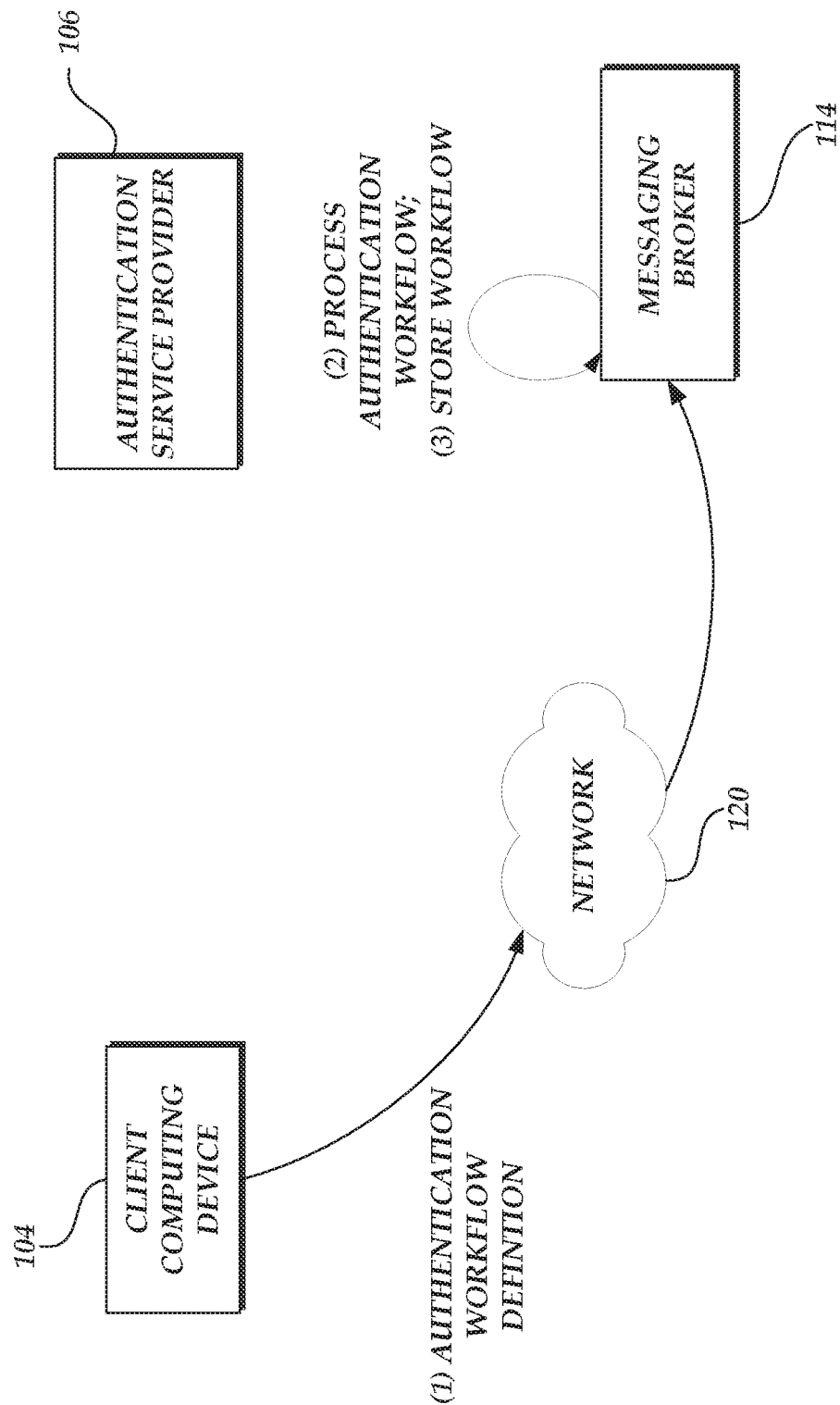
FIG. 5A is a block diagram of the authentication management environment of FIG. 1 illustrating the interaction between the illustrated components for configuring an authentication workflow in accordance with an illustrative embodiment.

With reference to FIG. 5A, at (1), the client computing device 104 generates a workflow definition or configuration request and transmits the request to the messaging broker 114 through the network 120. Illustratively, the workflow definition and configuration request corresponds to established procedures associated with the authentication and authorization of the client computing device 104 with the messaging broker 114 and can include additional components or communications to initiate the processing of the request. Illustratively, workflows can define the additional credentials required by one or more services based on the authentication provided by the client computing device 104. The workflows can illustratively associate credentials based on client identifiers, authentication techniques utilized, time of day, network location (e.g., IP address), etc. The specification of a workflow may be accomplished via a graphical user interface or software application on the client computing device 104. Additionally, the definition of the workflows may be transmitted by an application program interface ("API").

At (2), the messaging broker 114 receives the configuration request and can process the workflow definition. Illustratively, the messaging broker 114 (or other component) can validate the definition of the workflows or supplement information regarding workflow configuration. For example, a customer may specific fields or workflow values for at least some workflows, such as specifying a list of client devices that may request credentials. In another example, the messaging broker 114 can compare the workflow definition with previously stored definitions to validate the definition of the workflow, identify differences or otherwise supplement values. At (3), the messaging broker 114 can store the workflow definitions for use as will be described below.

Figure 5B:
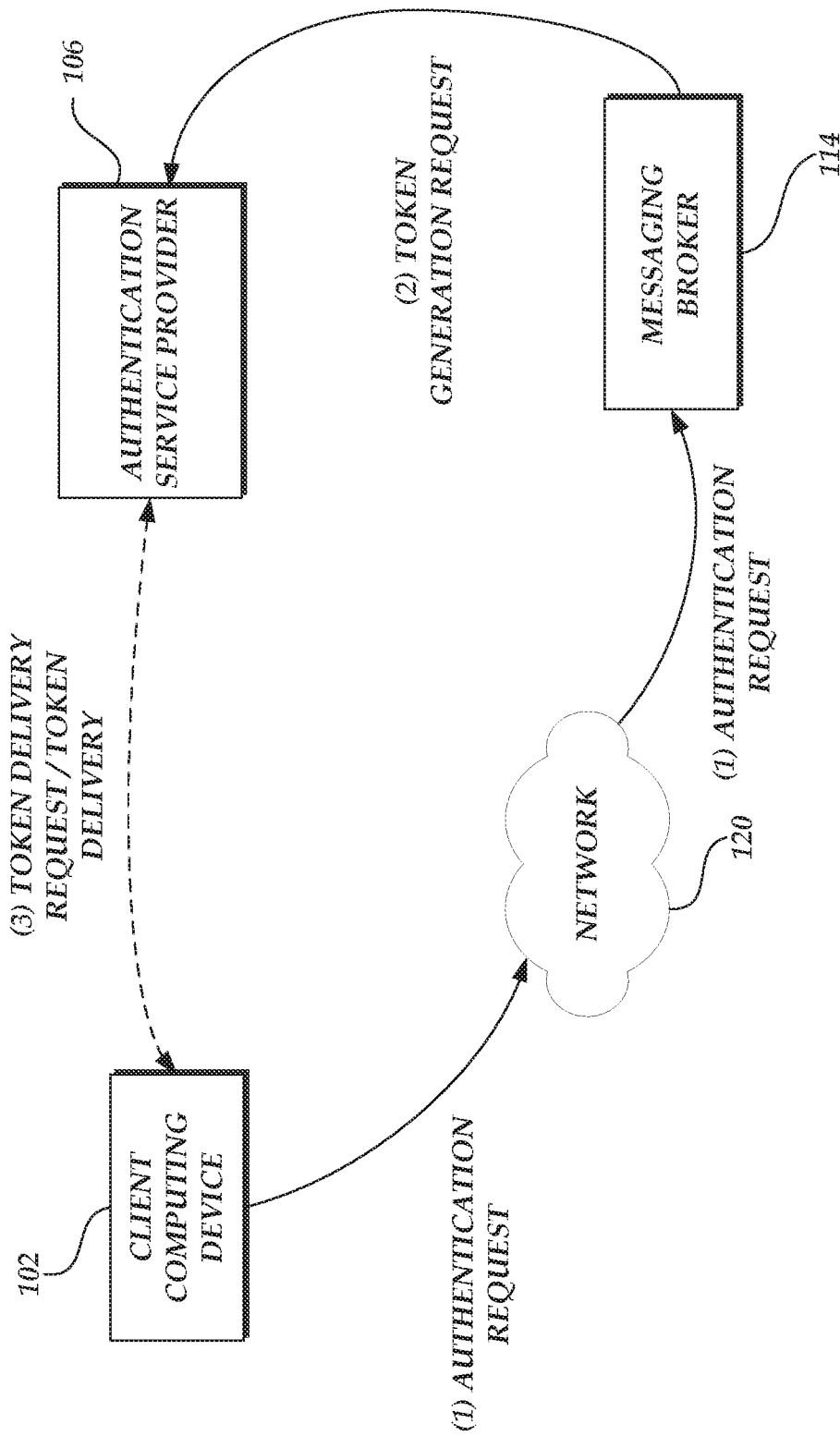
FIG. 5B is a block diagram of the authentication management environment of FIG. 1 illustrating the interaction between the illustrated components for requesting and generating authentication information including an access token in accordance with an illustrative embodiment.

With reference to FIG. 5B, at (1), the client computing device 102 generates an authentication request and transmits the request to the messaging broker 114 through the network 120. Illustratively, the authentication request corresponds to established procedures associated with the authentication and authorization of the client computing device 102 with the messaging broker 114. The authentication request can be sent alone or in conjunction with any type of device connection request, such as a request for content delivery, a transmission of other data related to the operation of the client computing device 102, a request for or confirmation of an executable command, or the like.

The messaging broker 114 processes the authentication request such as by validating security information, requesting additional information or determining the characteristics of the requesting client computing device 102. In some embodiments, processing the authentication request at the messaging broker 114 can include a plurality of messages exchanged between the client computing device 102 and the messaging broker 114 in accordance with an authentication protocol, such as the TLS handshake protocol. In some embodiments, the messaging broker 114 can simply validate the authentication of the client computing device 102 without need for at least a portion of the additional interactions illustrated in FIGS. 5A and 5B.

With continued reference to FIG. 5B, in some embodiments, the client computing device 102 can receive validation tokens that facilitate authentication with the messaging broker. Accordingly, in this embodiment, at (2), if the authentication request is acceptable and authorized (e.g., the client computing device 102 is authenticated), the messaging broker 114 transmits a token generation request to the authentication service provider 106. The token generation request may include information corresponding to an identity of the client computing device 102, one or more rules or permissions associated with the client computing device, and/or any other authentication-related information. The authentication service provider may generate an access token based on the token generation request. The token may be secured, such as by encryption, and may be generated in accordance with a standard token protocol, such as OpenID Connect.

At (3), the authentication service provider 106 delivers the token to the client computing device 102. In some embodiments, the token may be delivered in response to a token delivery request sent from the client computing device 102 to the authentication service provider 106, or the token may be delivered based on an instruction contained within the token generation request sent by the messaging broker 114 at (2). The access token may be stored at the client computing device 102.

Figure 5C:
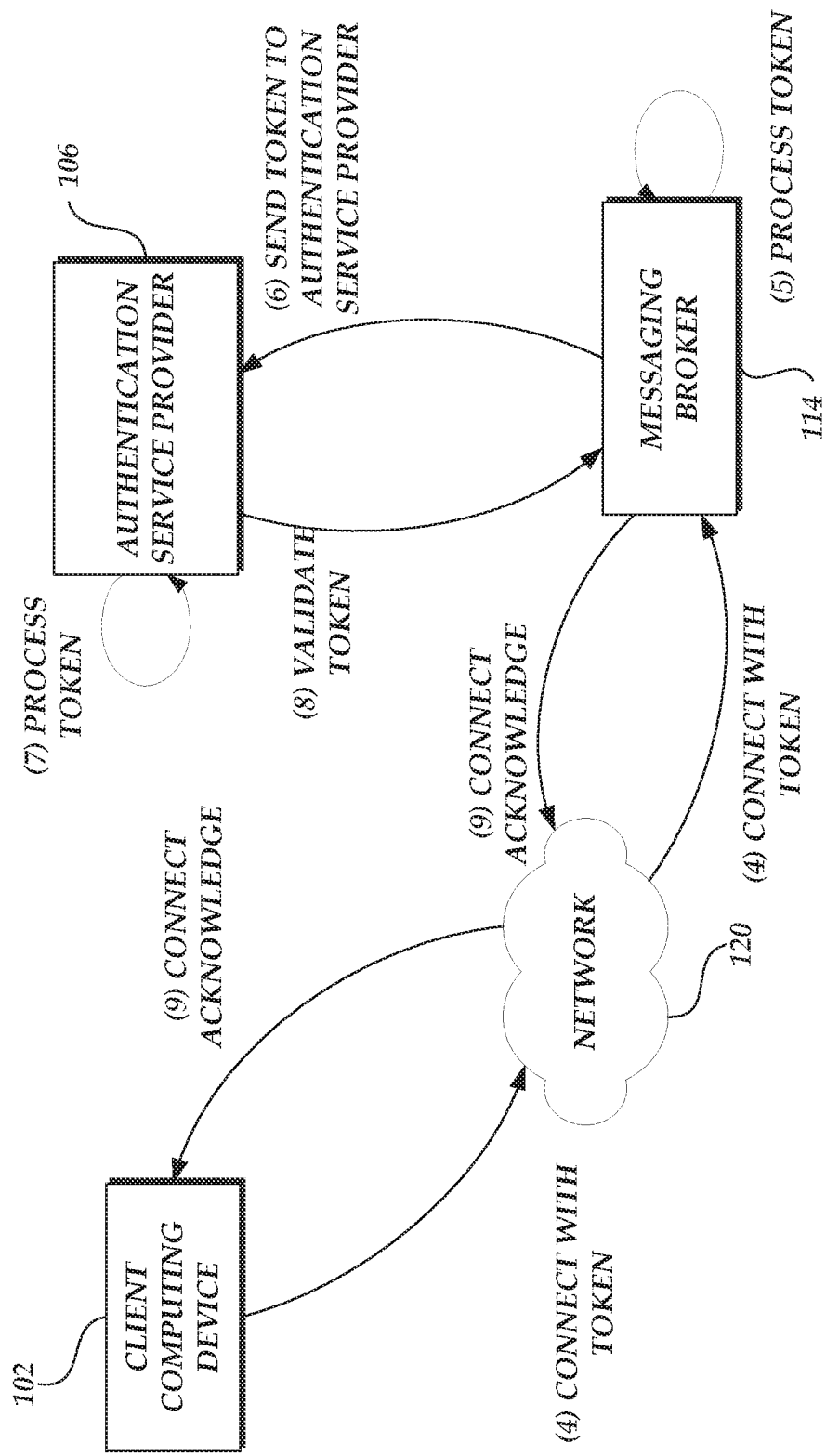
FIG. 5C is a block diagram of the authentication management environment of FIG. 1 illustrating the interaction between the illustrated components in authenticating and validating an access token in accordance with an illustrative embodiment.

With reference now to FIG. 5C, after receiving and storing the access token, at (4), the client computing device 102 connects to the messaging broker 114 and transmits a subsequent authentication request, including the token, to the messaging broker 114 through the network 120. Illustratively, the subsequent authentication request is sent after a time delay following the first authentication request at (1). For example, the subsequent authentication request may be sent seconds, minutes, hours, days, or longer, after the first authentication request. The subsequent authentication request may differ from the first authentication request by not containing a request for a mutual authentication protocol. For example, the first authentication request may have contained a request for TLS handshake authentication, and the subsequent authentication request may contain the stored token for unilateral authentication by the messaging broker 114 or the authentication service provider 104 without utilizing a mutual authentication method.

At (5), the messaging broker 114 processes the token received from the client computing device 102 in the authentication request. Illustratively, the messaging broker 114 determines the identity of the client computing device 102 sending the token and may determine if the token is to be used by that client computing device 102. At (6), the messaging broker 114 sends the token or a subset of information contained within the token to the authentication service provider 106. The messaging broker 114 may send additional information with the token, such as the identity of the client computing device 102 that sent the token, a time of connection, or any other information associated with the client computing device 102 or the authentication request.

At (7), the authentication service provider 106 processes the token, such as by comparing the token and/or other information received from the messaging broker 114 to stored information associated with the generation of the token. For example, the authentication service provider 106 may perform any one or a combination of decrypting the token, verifying a digital signature contained in the token, and verifying the status of a certificate associated with the token (e.g., determining a certificate status such as ACTIVE, INACTIVE, REVOKED, or the like). If the authentication service provider 106 determines that authentication can be allowed, the authentication service provider 104 validates the token at (8), such as by sending a message to the messaging broker 114 indicative of a successful authentication outcome. At (9), if the token is validated, the messaging broker 114 sends a connection acknowledgement to the client computing device 102 through the network 120 indicative of the validation. Thus, all authentication procedures may be carried out unilaterally by the messaging broker 114 or by the messaging broker 114 and the authentication service provider 106, without the use of any mutual authentication procedures, including additional messages sent from the client computing device 102.

Figure 5D:
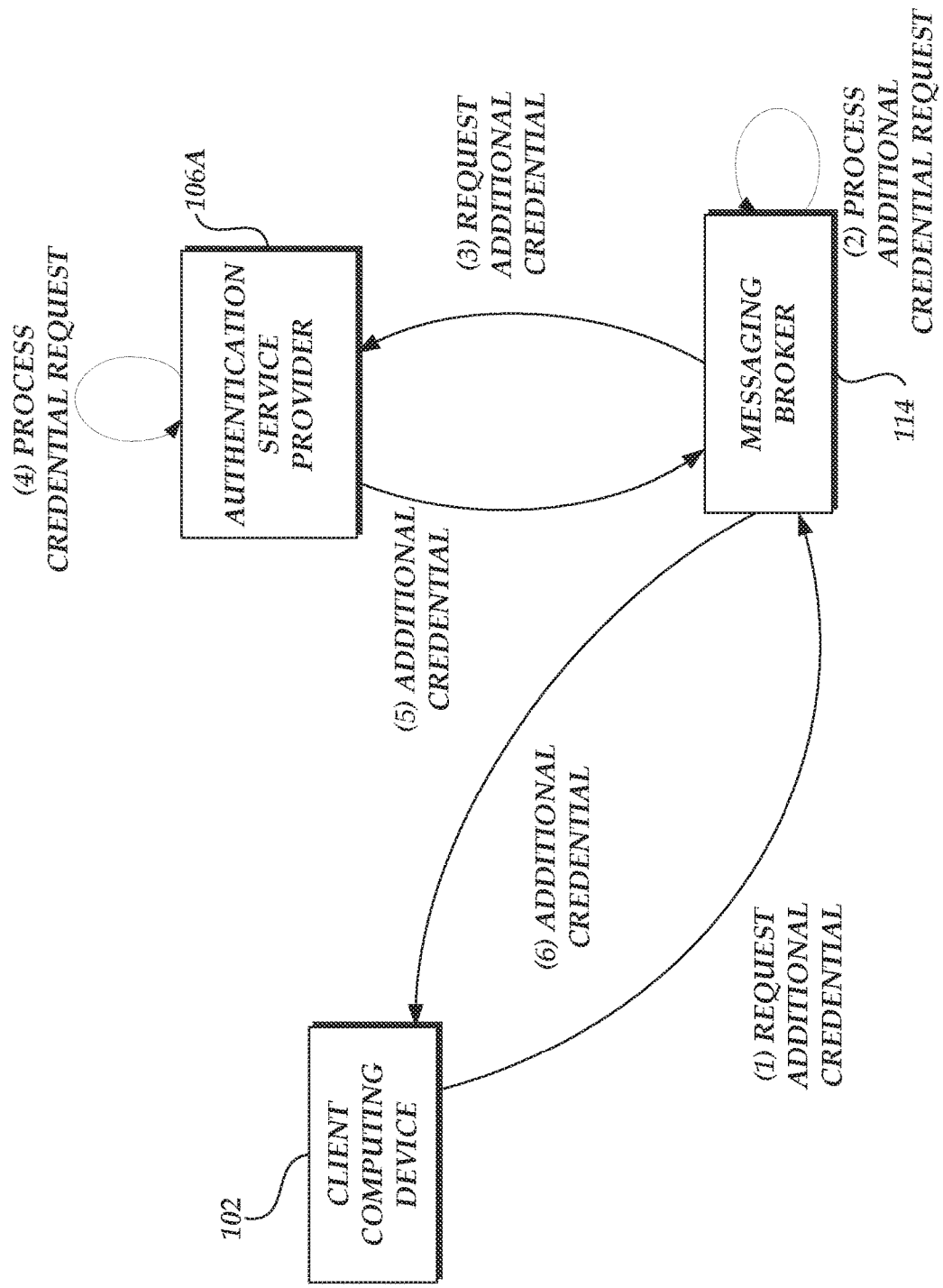
FIG. 5D is a block diagram of the authentication management environment of FIG. 1 illustrating the interaction between the illustrated components in generating and validating additional service credentials in accordance with an illustrative embodiment.

Turning now to FIG. 5D, illustrative interactions between the components of the content management system 110 to generate additional credentials for a client computing device 102 will be described. More specifically, FIG. 5D will be described with regard to interactions between a client computing device 102, an authentication service provider 106A and the messaging broker 114. In this embodiment, the content management system 110 can utilize the authentication mechanisms illustrated in FIGS. 5A-5C to provide additional credentials, tokens, keys or other information utilized by the client computing device 102 to access additional services. For purposes of illustration, the additional information will be generally described as "additional credentials" without limit to the type of information provided. Examples of such services can include, but are not limited to, storage services, security services, data processing, and the like. Accordingly, the use of the additional credential may further facilitate the interaction of client computing devices 102 or client computing devices 102A with the service providers without requiring additional computing resources, functionality or protocol support for different services accessed by the client computing devices.

With reference to FIG. 5D, at (1), the client computing device 102 has authenticated with the messaging broker 114 and transmits a request for additional credentials. Illustratively, the request for additional credentials can be accomplished in accordance with a messaging protocol, such as the MQTT messaging protocol. For example, the client computing device 102 can register to receive a topic related or otherwise designated as a request for the additional credentials. In another embodiment, the client computing device 102 can transmit a request via a different message protocol to the messaging broker, such as part of the initial authentication protocol. Still further, in other embodiments, the request for additional credentials may be automatically generated or created at the messaging broker 114, such as specified in a client computing device profile without require an actually transmission of the At (2), the messaging broker 114 processes the additional credentials request. Illustratively, the processing of the additional credentials request can include the execution of workflow that the messaging broker 114 invokes to identify the credentials to be provided to the client computing device 102. In one aspect, the workflow can be predefined by a customer or service provider that defines the additional credentials required by one or more services based on the authentication provided by the client computing device 102. The additional credentials may vary based on the type of authentication utilized by the client computing device.

In another embodiment, the additional credentials can further be based on additional criteria included in the request or contemporaneous with the request. For example, the messaging broker 114 may implement rules that incorporate additional information such as time of day, network, addressing information, network routing information, tokens (as illustrated above). In these embodiments, the type of additional credentials may vary based on the additional criteria. For example, the additional credentials may be associated with an expiration time based on the time of day. In another example, the messaging broker 114 may select from two or more additional credentials based on the network address. In still another example, the messaging broker 114 may reject the request if a profile of information, such as network routing information, does not match with the request.

At (3), the messaging broker 114 sends a request to an authentication service provider 106A. Illustratively, the authentication service provider 106A can correspond to an authentication service provider configured specifically for a type of service, such as a storage authentication service provider or security authentication service provider. In other embodiments, the authentication service provider 106A can correspond to an authentication service provider that is common to a set of service providers. Still further, in some embodiments the authentication service provider 106 may be different from the authentication service provider 106A.

At (4), the authentication service provider 106A validates the request and at (5) sends the requested credentials to the messaging broker 114. Illustratively, the authentication service provider 106A can utilize pre-configured authentication information provided by the messaging broker 114. For example, the messaging broker 114 can utilize information in a data store or profile to provide the authentication service provider 106A with information utilized to provide the additional credentials. At (6), the messaging broker 114 returns the additional credentials to the client computing device 102. Illustratively, the client computing device 102 can utilize the additional credentials to access the service without requiring the additional interaction with service provider to authenticate the client computing device 102.

Figure 6:
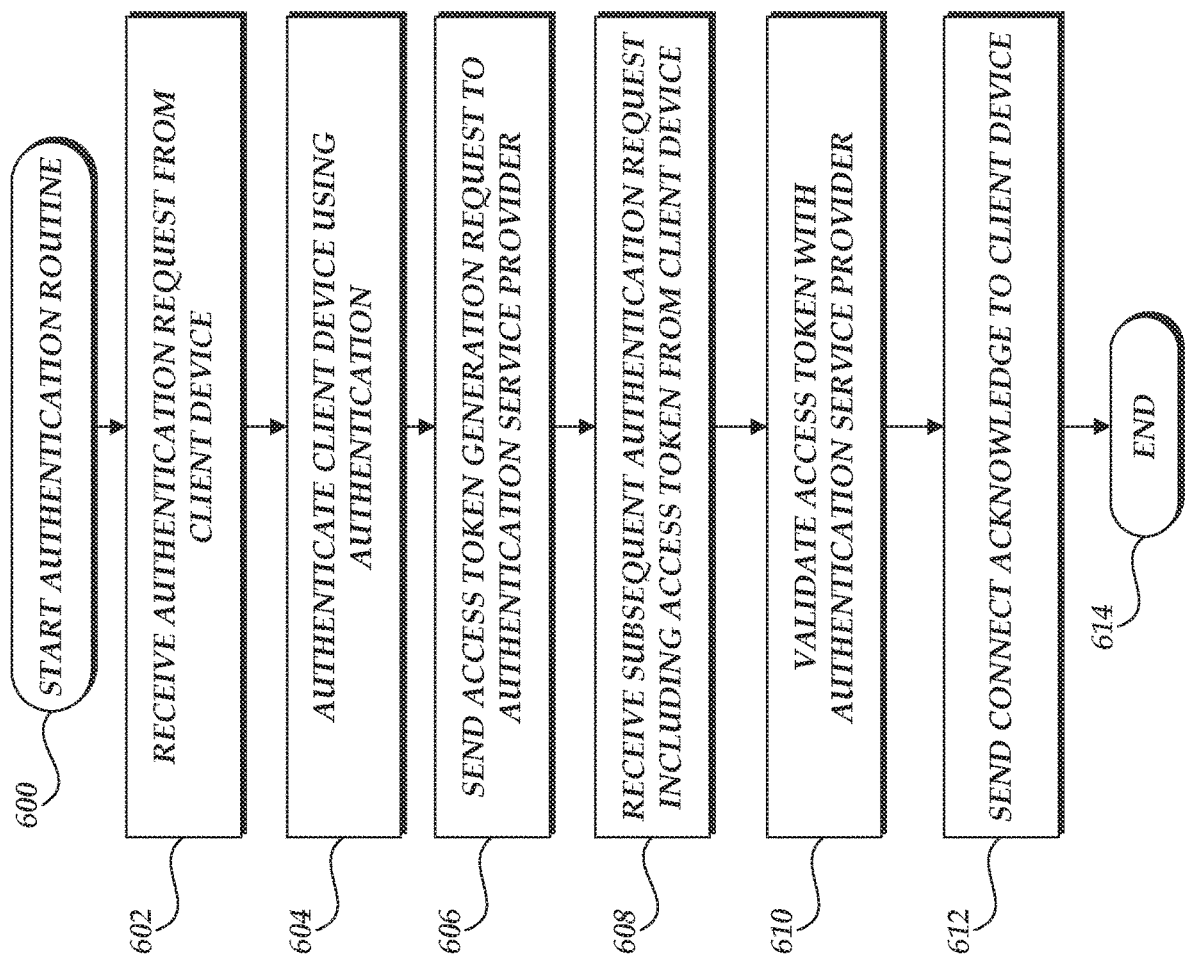
FIG. 6 is a flow diagram illustrative of an authentication routine implemented by an messaging broker component in accordance with an illustrative embodiment.

FIG. 6 is a flow diagram illustrative of an authentication routine 600 implemented by a messaging broker 114 in accordance with an illustrative embodiment. At block 602, the messaging broker 114 receives an authentication request from a client computing device 102. Illustratively, the authentication request is made in accordance with a mutual authentication protocol, such as the TLS handshake protocol. As described previously, the authentication request can be published and received in accordance with a messaging protocol, such as MQTT.

After receiving the authentication request, at block 604, the messaging broker 114 authenticates the client computing device 102 using a mutual authentication protocol. Illustratively, the messaging broker 114 and the client computing device 102 engage in a TLS handshake or other handshake protocol, including a plurality of messages sent by each of the client computing device 102 and the messaging broker 114. Following the completion of the mutual authentication, the messaging broker determines that the client computing device 102 is authenticated for subsequent communication.

At block 606, the messaging broker 114 sends an access token generation request to an authentication service provider 104. The access token generation request can cause the authentication service provider 104 to generate an access token to be used in subsequent communication between the client computing device 102 and the messaging broker 114. The access token can be encrypted or otherwise secured using any known data security methods or protocols. In some embodiments, the authentication service provider 104 sends an acknowledgement to the messaging broker 114. The acknowledgement can include sufficient information (e.g., the token or other data associated with the token) to enable the messaging broker 114 to subsequently validate the access token without requiring additional communication with the authentication service provider 104. In other embodiments, the acknowledgement does not include the token, such that any subsequent authentication of the token may still necessitate additional communication between the messaging broker 114 and the authentication service provider 104. As described with reference to FIG. 5B, the authentication service provider can deliver the access token to the client computing device 102.

At block 608, the messaging broker 114 receives a subsequent authentication request from the client computing device 102, the subsequent authentication request including the access token. Illustratively, the subsequent authentication request is sent some time after the mutual authentication. For example, the subsequent authentication request may not occur until a communication between the client computing device 102 and the messaging broker 114 is desired for another reason, such as for the execution of an update or other command in accordance with the operation of the client computing device 102. At block 610, the messaging broker 114 validates, with the authentication service provider 104, the access token received in the subsequent authentication request. Illustratively, validation of the access token includes sending the access token to the authentication service provider 104 accompanied by additional information associated with the request, such as an identity of the client computing device 102, an additional command or request included with the authentication request, or other available information related to the subsequent authentication request. The authentication service provider 104 can process the access token as described herein with reference to FIG. 5C and transmit a result, such as "token valid" or "token not valid" to the messaging broker 114.

At block 612, if the token is validated, the messaging broker 114 sends a connection acknowledgement to the client device 102. In various embodiments, the acknowledgement can be any message indicating the successful validation of the token, such as a CONNACK response. Illustratively, the transmittal of the connection acknowledgement is also done in accordance with the procedures and capabilities of the messaging protocol, such as MQTT, and does not require additional or alternative communications to cause the transmission of the acknowledgement. At block 614, the routine 600 terminates.

FIG. 7 is a flow diagram illustrative of additional credentials generation routine 700 implemented by a messaging broker 114 in accordance with an illustrative embodiment. For purposes of routine 700, the messaging broker 114 the client computing device 102 has authenticated with the messaging broker 114 and transmits a request for additional credentials. Accordingly, at block 702, the messaging broker 114 obtains the request for additional credentials. Illustratively, the request for additional credentials can be accomplished in accordance with a messaging protocol, such as the MQTT messaging protocol. For example, the client computing device 102 can register to receive a topic related or otherwise designated as a request for the additional credentials. In another embodiment, the client computing device 102 can transmit a request via a different message protocol to the messaging broker, such as part of the initial authentication protocol. Still further, in other embodiments, the request for additional credentials may be automatically generated or created at the messaging broker 114, such as specified in a client computing device profile without require an actually transmission of the At block 704, the messaging broker 114 processes the additional credentials request. Illustratively, the processing of the additional credentials request can include the execution of workflow or protocol that the messaging broker 114 invokes to identify the credentials to be provided to the client computing device 102. In one aspect, the workflow can be predefined by a customer or service provider (e.g., client computing device 104) that defines the additional credentials required by one or more services based on the authentication provided by the client computing device 102 as illustrated in FIG. 5A. The additional credentials may vary based on the type of authentication utilized by the client computing device.

In another embodiment, the additional credentials can further be based on additional criteria included in the request or contemporaneous with the request. For example, the messaging broker 114 may implement rules that incorporate additional information such as time of day, network, addressing information, network routing information, tokens (as illustrated above). In these embodiments, the type of additional credentials may vary based on the additional criteria. For example, the additional credentials may be associated with an expiration time based on the time of day. In another example, the messaging broker 114 may select from two or more additional credentials based on the network address. In still another example, the messaging broker 114 may reject the request if a profile of information, such as network routing information, does not match with the request.

At block 706, the messaging broker 114 sends a request to an authentication service provider 106A. Illustratively, the authentication service provider 106A can correspond to an authentication service provider configured specifically for a type of service, such as a storage authentication service provider or security authentication service provider. In other embodiments, the authentication service provider 106A can correspond to an authentication service provider that is common to a set of service providers. Still further, in some embodiments the authentication service provider 106 may be different from the authentication service provider 106A. Illustratively, the authentication service provider 106A can utilize pre-configured authentication information provided by the messaging broker 114. For example, the messaging broker 114 can utilize information in a data store or profile to provide the authentication service provider 106A with information utilized to provide the additional credentials.

At block 708, the messaging broker 114 receives the additional credentials. At block 710, the messaging broker 114 returns the additional credentials to the client computing device 102. Illustratively, the client computing device 102 can utilize the additional credentials to access the service without requiring the additional interaction with service provider to authenticate the client computing device 102. At block 712, the routine 700 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing the authentication of a computing device comprising:
   receiving, by a messaging broker, a first authentication request from a remote device, the first authentication request comprising a message in accordance with the MQ Telemetry Transport protocol;
   authenticating, by the messaging broker, the remote device based on the first authentication request in accordance with an authentication protocol;
   obtaining, by the messaging broker, a request from the remote device for an additional credential to allow the remote device to access at least one service; and
   in response to the request from the remote device for the additional credential:
      invoking, by the messaging broker, an authentication workflow to identify at least one additional authentication credential to be provided to the remote device;
      transmitting, by the messaging broker, a request for the identified at least one additional authentication credential based on the previous authentication of the remote device;
      obtaining, by the messaging broker, the requested at least one additional authentication credential, and
      transmitting, by the messaging broker, the at least one additional authentication credential to the remote device.

2. The computer-implemented method of claim 1 further comprising sending, by the messaging broker, a token generation request to an authentication service provider device, wherein the token generation request causes the authentication service provider device to generate an access token for authentication of the remote device.

3. The computer-implemented method of claim 1, wherein transmitting the request for the identified at least one additional authentication credential based on the previous authentication of the remote device includes transmitting at least one additional information associated with the remote device.

4. The computer-implemented method of claim 1, wherein the authentication protocol includes the TLS handshake protocol.

5. A system for managing the authentication of a computing device comprising:
   one or more remote devices configured to send authentication requests in accordance with a messaging protocol;
   a messaging broker configured to:
      authenticate the one or more remote devices in accordance with an authentication protocol,
      obtain a request from an authenticated remote device for an additional credential to allow the remote device to access at least one service of a service provider;
      obtain, in response to the request from the authenticated remote device, the requested at least one additional credential to allow the authenticated remote device to access the at least one service; and
      transmit the requested at least one additional credential to the remote device; and
   an authentication service provider device configured to:
      generate the at least one additional credential based on a request from the messaging broker.

6. The system of claim 5, wherein the messaging broker invokes a credential workflow based on authenticating the remote device.

7. The system of claim 6, wherein the messaging broker is further configured to:
   obtain a definition of the workflow.

8. The system of claim 5, wherein the messaging broker receives the request for the additional credential from the remote device.

9. The system of claim 7, wherein the messaging broker receives the request for the additional credential from the remote device responsive to the authentication of the remote device.

10. The system of claim 5, wherein the messaging broker transmits at least one additional piece of information with the request for additional credentials.

11. The system of claim 10, wherein the at least one additional piece of information includes one of a time of day, network addressing information, or network routing information.

12. The system of claim 5, wherein the remote device, the messaging broker, and the authentication service provider are configured to communicate using the MQ Telemetry Transport messaging protocol.

13. A computer-implemented method for authenticating a computing device comprising:
   authenticating, by a messaging broker, a remote device based on a first authentication request in accordance with an authentication protocol;
   identifying, in response to a request from the remote device for an additional credential to allow the remote device to access at least one service, at least one additional authentication credential to be provided to the remote device;
   transmitting, by the messaging broker in response to the request from the remote device, a request for the identified at least one additional authentication credential based on the previous authentication of the remote device;
   obtaining, by the messaging broker, the requested at least one additional authentication credential, and
   transmitting, by the messaging broker, the at least one additional authentication credential to the remote device.

14. The computer-implemented method of claim 13, wherein the authentication protocol comprises the Transport Layer Security handshake protocol.

15. The computer-implemented method of claim 13 further comprising invoking, by the messaging broker, an authentication workflow to identify at least one additional authentication credential to be provided to the remote device.

16. The computer-implemented method of claim 13 further comprising receiving a request from the remote device for additional credentials.

17. The computer-implemented method of claim 13, wherein the additional credential is configured by at least one of a customer or a service provider.

18. The computer-implemented method of claim 13, wherein the additional credential is dependent on at least one additional piece of information provided by the messaging broker.

19. The computer-implemented method of claim 13, wherein the additional credential is selected based on at least one additional piece of information provided by the messaging broker.

20. The computer-implemented method of claim 13, wherein the computing device and the authentication service provider are configured to receive and publish messages in accordance with the MQ Telemetry Transport protocol, wherein sending the token delivery request comprises publishing a message on a topic to which the authentication service provider is subscribed, and wherein the access token is received in a message published by the authentication service provider on a topic to which the computing device is subscribed.

* * * * *